United States Patent
Hyser et al.

(10) Patent No.: US 7,925,923 B1
(45) Date of Patent: Apr. 12, 2011

(54) MIGRATING A VIRTUAL MACHINE IN RESPONSE TO FAILURE OF AN INSTRUCTION TO EXECUTE

(75) Inventors: Chris D Hyser, Victor, NY (US); Bret McKee, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 266 days.

(21) Appl. No.: 12/260,787

(22) Filed: Oct. 29, 2008

Related U.S. Application Data

(60) Provisional application No. 61/025,030, filed on Jan. 31, 2008.

(51) Int. Cl.
*G06F 11/00* (2006.01)

(52) U.S. Cl. .......................................... 714/13; 714/11

(58) Field of Classification Search ................ 714/4, 11, 714/13
See application file for complete search history.

(56) References Cited

U.S. PATENT DOCUMENTS

| | | | |
|---|---|---|---|
| 5,283,881 A | 2/1994 | Martini | |
| 5,488,716 A * | 1/1996 | Schneider et al. ............... | 714/10 |
| 5,627,992 A | 5/1997 | Baror | |
| 6,629,252 B1 | 9/2003 | Gholami | |
| 6,763,328 B1 | 7/2004 | Egolf | |
| 6,854,115 B1 * | 2/2005 | Traversat et al. .................. | 718/1 |
| 7,007,172 B2 | 2/2006 | Catherwood | |
| 7,178,062 B1 | 2/2007 | Dice | |
| 7,536,581 B2 * | 5/2009 | Fiske ............................... | 714/4 |
| 7,577,959 B2 * | 8/2009 | Nguyen et al. ................ | 718/105 |
| 2003/0018927 A1 * | 1/2003 | Gadir et al. ........................ | 714/4 |
| 2003/0233491 A1 | 12/2003 | Bracha | |
| 2006/0195715 A1 * | 8/2006 | Herington ......................... | 714/4 |
| 2006/0200819 A1 | 9/2006 | Cherkasova | |
| 2006/0248528 A1 | 11/2006 | Oney | |
| 2007/0006226 A1 | 1/2007 | Hendel | |
| 2007/0156387 A1 | 7/2007 | Guenther | |
| 2009/0138752 A1 * | 5/2009 | Graham et al. .................... | 714/4 |
| 2009/0276658 A1 * | 11/2009 | Lind et al. ......................... | 714/4 |

FOREIGN PATENT DOCUMENTS

| | | |
|---|---|---|
| GB | 1063141 A | 3/1967 |
| JP | 2005038420 A | 2/2005 |

* cited by examiner

*Primary Examiner* — Marc Duncan

(57) ABSTRACT

A virtual machine is migrated from a first physical machine to a second physical machine in response to a failure of an instruction to execute. A migration constraint also is created which limits future migration of the virtual machine by a placement controller to only those physical machines that can execute the failed instruction.

20 Claims, 3 Drawing Sheets

MIGRATING A VIRTUAL MACHINE IN RESPONSE TO FAILURE OF AN INSTRUCTION TO EXECUTE

CROSS-REFERENCE TO RELATED APPLICATIONS

This application claims the benefit of U.S. Provisional patent application Ser. No. 61/025,030, filed Jan. 31, 2008, which is hereby incorporated by reference in it's entirety.

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system in a virtual machine can be different from the host operating system that may be running on the computer on which the virtual machine is deployed.

In addition, a greater level of isolation is provided between or among applications running in different virtual machines than is provided by running applications in a single virtual or physical machine. In some cases, virtual machines also allow multiple applications to more efficiently share common resources (processing resources, input/output or I/O resources, and storage resources) of the computer. Such sharing of hardware resources is performed by virtualizing the hardware resources with a virtual machine control entity, such as a hypervisor.

For enhanced performance, virtual machines can be provided on multiple physical machines (e.g., computers) that are interconnected by a network. In some implementations, an automated placement controller has been provided to determine computers that the virtual machine is to be deployed on. Based on predetermined criteria, the placement controller is able to migrate at least some of the virtual machines across different computers.

The predefined criteria may include predefined migration constraints that limit migration of certain virtual machines to particular physical machines. In some instances, such migration constraints may be overly conservative in order to decrease the likelihood that migration of a virtual machine may result in an undesirable situation. For instance, a constraint may be created that limits migration of a particular virtual machine to only those physical machines having a processor that is compatible with the processor on which the virtual machine initially was placed. However, as it oftentimes is likely that the applications executing on that particular virtual machine can just as readily run on a physical machine having an incompatible processor (i.e., a processor supporting a different instruction set), such a migration constraint may, in many cases, needlessly limit the flexibility of the automated placement controller.

DETAILED DESCRIPTION

Figure 1:
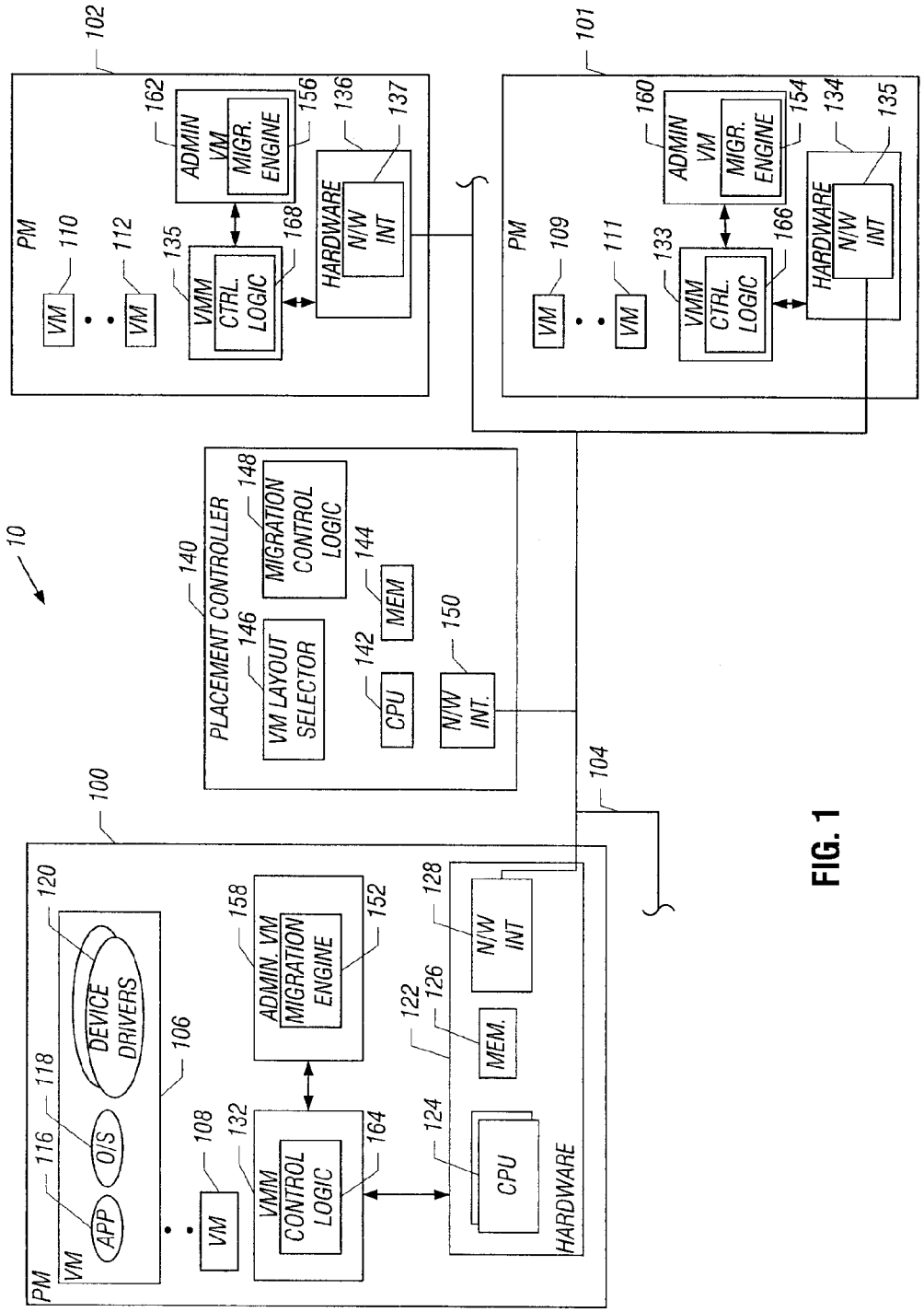
FIG. 1 is a block diagram of a system of physical machines on which virtual machines are deployed according to an embodiment of the invention.

FIG. 1 illustrates an exemplary arrangement of a system 10 which includes multiple physical machines (PMs), virtual machines (VMs) located on the physical machines, and one or more placement controllers to control the placement of the virtual machines on the physical machines. As shown in FIG. 1, physical machines 100, 101 and 102 are interconnected by a network 104. The network 104 may include, for example, a local area network (LAN), a wide area network (WAN), the Internet or any other type of communication link. In addition, the network 104 may include system buses or other fast interconnects, which are not depicted in FIG. 1. The physical machines 100, 101, 102 may be located within one cabinet (or rack), or alternatively, the physical machines 100, 101, 102 may be located in multiple cabinets (or racks).

The system 10 shown in FIG. 1 may be any one of an application server farm, a storage server farm (or storage area network), a web server farm, a switch or router farm, etc. Although three physical machines 100, 101, 102 are depicted in FIG. 1, it is understood that the system 10 may include more than two physical machines, depending on the particular application in which the system 10 is employed. The physical machines may be, for example, computers (e.g., application servers, storage servers, web servers, etc.), communications modules (e.g., switches, routers, etc.) and other types of machines. Although each of the physical machines is depicted in FIG. 1 as being contained within a box, a particular physical machine 100 may be a distributed machine, which has multiple nodes that provide a distributed and parallel processing system.

Each physical machine, such as machine 100, provides a platform for various virtual machines. In the example of FIG. 1, physical machine 100 includes two virtual machines 106, 108, and physical machines 101 and 102 also include two virtual machines 109, 111 and 110, 112, respectively. In other implementations, each physical machine may contain fewer or more virtual machines depending on the particular application.

As illustrated in FIG. 1, and according to an exemplary embodiment of system 10, the virtual machine 106 includes one or more software applications 116, an operating system 118, and one or more device drivers 120 (which typically are part of the operating system 118). The other virtual machines 108-112 shown in FIG. 1 may also include software applications, operating systems, and device drivers. It should be understood that the operating systems that are part of corresponding virtual machines within a physical machine can be different types of operating systems or different versions of an operating system. This allows software applications designed for different operating systems to execute on the same physical machine.

Certain virtual machines within a physical machine are designed to share the physical resources of the physical machine. For instance, in the physical machine 100, these physical resources include the hardware resources 122, which include one or more central processing units (CPUs) or processors 124, memory (volatile memory and/or persistent storage, such as disk-based storage) 126, a network interface 128, and other resources (e.g., a storage area network interface (not shown)). Physical machines 101 and 102 may include similar hardware resources 134 and 136 with respective network interfaces 135 and 137, for example.

To manage sharing by the virtual machines of the hardware resources 122, a virtual machine monitor (VMM) 132 (e.g., a hypervisor) is provided. The VMM 132 virtualizes some of the hardware resources 122. Also, the VMM 132 intercepts requests for resources from the operating systems in the various virtual machines so that proper allocation of the physical resources of the physical machine 100 may be performed. For instance, the VMM 132 may manage memory access, I/O device access, and CPU scheduling for the virtual machines. Effectively, the VMM 132 provides an interface between the operating system of a virtual machine and the underlying hardware resources 122 of the physical machine 100. The interface provided by the VMM 132 to an operating system is designed to emulate the interface provided by the actual hardware of the physical machine 100. Physical machines 101 and 102 likewise include similar VMMs 133 and 135.

Virtual machines can be migrated among different physical machines according to various criteria. Placement of the virtual machines on the physical machines is controlled by one or more placement controllers, such as the placement controller 140. Migrating a virtual machine refers to moving the state of the virtual machine from one physical machine to another physical machine. The state of the virtual machine includes content of registers of various hardware devices (e.g., CPUs, I/O devices, etc.). Data in memory associated with the migrated virtual machine can also be transferred gradually (e.g., lazily) to the destination physical machine to which the virtual machine is migrated.

As shown in FIG. 1, the placement controller 140 includes one or more CPUs 142, memory 144, a VM layout selector 146, and migration control logic 148. Also, a network interface 150 is provided in the placement controller 140 to allow communication between the placement controller 140 and the network 104.

The VM layout selector 146 may cooperate with the migration control logic 148 to control migration of virtual machines according to a layout selected by the VM layout selector 146. Alternatively, the VM layout selector 146 may cooperate with migration engines 152, 154, 156 to control the migration of virtual machines across the physical machines. In the example shown in FIG. 1, the migration engines 152, 154, 156 that are deployed in corresponding physical machines 100, 101, 102 may be provided as part of administrative virtual machines 158, 160, 162, respectively. An administrative virtual machine is used to perform administrative tasks associated with the corresponding physical machine. Alternatively, the migration engines 152, 154, 156 may be separate from the administrative virtual machines.

In general, the placement controller 140 determines an efficient placement of virtual machines across physical machines based on predefined criteria, such as a target policy set by an enterprise, a user, an administrator, etc. In accordance with some embodiments, the predefined criteria may include a criterion based on communications of traffic (e.g., data packets, control packets, or any other type of data units) among virtual machines. Further criteria that may be considered include a target quality-of-service level to be provided to each virtual machine, loading criteria (which specify some target loading level on a physical resource or machine), balancing criteria (which specify that the load on physical machines should be balanced when possible), cooling criteria (which specify temperatures in physical machines that should not be exceeded), power criteria (which specify that power consumption should be reduced when possible), cost of migrating virtual machines, criteria indicating which virtual machines should be run on different physical machines, criteria specifying a limit on frequency of virtual machine migration, and other criteria.

Although these various criteria often do result in an efficient placement and migration of virtual machines across the physical machines, there may be instances in which the predefined criteria overly constrain migration and thus needlessly limit migration flexibility. For instance, in some systems, a migration constraint may be created that limits migration of virtual machines to physical machines having compatible processors. As used herein, "compatible" processors are processors which support the same instruction set. Likewise, "incompatible" processors are processors that do not support the same instruction set. Such a migration constraint may be viewed as useful or even necessary because it addresses the scenario in which new processors that incorporate new or expanded instruction sets (e.g., a new version of a processor having instructions which support additional multimedia capabilities) are added to the network of physical machines. As new applications are written that make use of the new instructions, it may be possible to migrate a virtual machine from a first physical machine that supports the new instructions to a second physical machine having an incompatible processor. When this occurs, an illegal instruction fault may result and the application may fail to run. Thus, creating a migration constraint that restricts each virtual machine to physical machines having processors that are compatible with the processor of the physical machine on which the virtual machine initially was placed may avoid occurrence of an illegal instruction fault. However, such a migration constraint typically will be overly limiting as it is likely that many applications that are placed on a physical machine having a processor with a new instruction set have no need for the extra capability (at least for some initial period of time during which the processor is relatively new). Thus, limiting migration of virtual machines to physical machines having compatible processors in reality may be an artificial constraint that needlessly limits migration flexibility.

Unfortunately, whether a particular application executing on a virtual machine can make use of a processor's new or expanded instruction set generally cannot be definitively known until the application actually executes. More specifically, when a virtual machine initially boots on a physical machine, it typically will determine the processing capabilities of the physical machine's CPU(s) (e.g., CPU 124) by, for instance, examining certain of the CPU's internal registers. Based on the information available from the registers, the virtual machine may determine the types of instructions that are supported by the CPU 124. If, during the boot procedure, the virtual machine determines that the processing capabilities of the CPU 124 support a new or expanded instruction set that the virtual machine can use, then the virtual machine may rewrite software code and reset internal states as needed to use the available instructions. Applications may then execute on the virtual machine using the CPU's new or expanded instruction set.

Once the virtual machine has rewritten software code and reset internal states to take advantage of the current CPU's processing capabilities, subsequent migration of the virtual machine (which moves the internal state of the virtual machine) to a physical machine having an incompatible CPU may be problematic. In such a case, when an application executing on the migrated virtual machine attempts to make use of a now unsupported instruction, an exception referred to as an illegal instruction fault will result.

In the exemplary embodiment illustrated in FIG. 1, to prevent the occurrence of an instruction fault from preventing execution of an application on a virtual machine, the VMM 132 includes control logic 164 (as part of an exception handler, for instance) which is configured to trap the instruction fault so that the offending instruction may be examined and a decision made as to whether the virtual machine should be migrated to a physical machine having a compatible processor. In some instances, if the control logic 164 determines that the offending instruction will not prevent the application from executing, then the virtual machine may not be migrated.

Thus, according to one example of the system 10, the processing capabilities of each physical machine are stored in a memory, such as the memory 126 of physical machine 100, when the physical machine is added to the system 10. This memory is accessible by the VMM 132 of the physical machine 100 and the contents of the memory 126 may be communicated to the other physical machines 101, 102 and/or the placement controller 140 via the network interface 128, 135, 136, 150 and the interconnect 104. As such, the processing capabilities of each of the physical machines in the system 10 may be accessed and ascertained by each VMM 132, 133, 135 and/or the placement controller 140. Accordingly, when a processing fault occurs in the physical machine 100, for instance, such as an illegal instruction trap or other instruction failure, the control logic 164 detects the fault and enables the VMM 132 to examine the offending instruction and determine whether the instruction is supported by any of the processing capabilities currently present in the system 10. Similarly, if an instruction fault is detected in physical machines 101 or 102, the VMMs 133, 135 in conjunction with their control logic 166, 168, may examine the instruction and ascertain if the instruction is supported elsewhere in the system 10. If the instruction is supported or can be executed by the currently available processing capabilities, then the virtual machine that resulted in the instruction fault may be migrated to a physical machine that does support the offending instruction.

Figure 2:
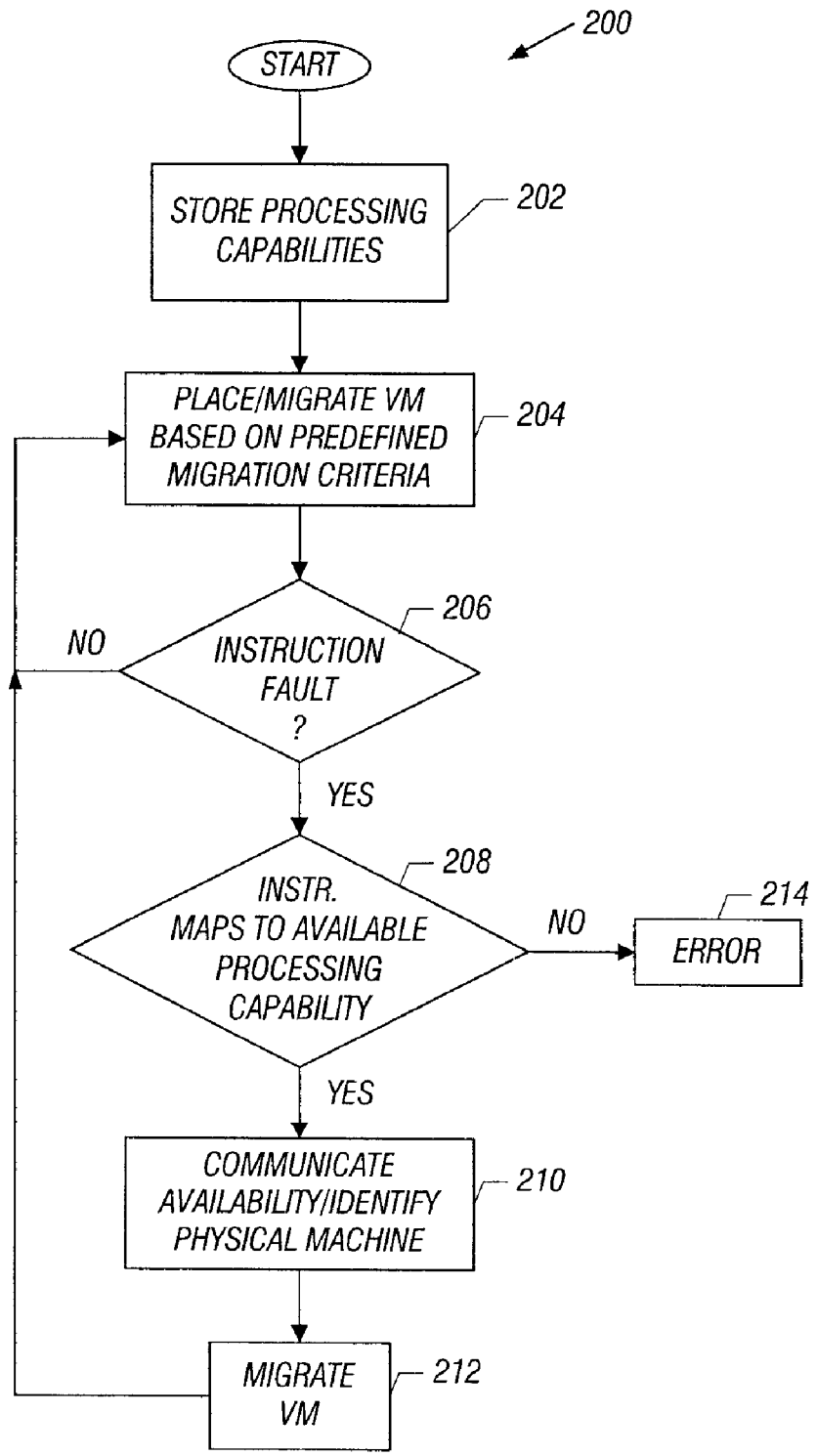
FIG. 2 is a flow diagram depicting a process for migrating a virtual machine in response to detection of an instruction fault according to an embodiment of the invention.

An example of a process 200 to enable these tasks is depicted in the flow diagram of FIG. 2. At creation time, the processing capabilities of each physical machine is stored in memory (block 202), and the placement controller 140 may place the various virtual machines on selected physical machines in accordance with predefined migration criteria or a particular layout specified by VM layout selector 146 (block 204). The system 10 may then be placed in operation and the placement controller 146 may continue to migrate the virtual machines across the various physical machines in response to predefined migration criteria (block 206), and the various virtual machines perform their assigned tasks.

In the event that the placement or migration of a particular virtual machine results in an instruction fault during execution of a particular application on a virtual machine as described above (diamond 208), then the VMM corresponding to that virtual machine may trap the fault and examine the instruction to determine whether the instruction is supported by or otherwise may be executed by the processing capabilities currently available elsewhere in the system 10 (diamond 210). The VMM may perform this task by determining whether the illegal instruction maps to a processing capability that is available in the system 10. If the VMM determines that the trapped instruction maps to a processing capability provided by one or more other physical machines, then the VMM may communicate that information to the placement controller 140 (block 210). The communicated information may include the identification of another physical machine which supports or otherwise may execute the instruction or may simply indicate to the placement controller 140 that the processing capability is available. In the latter case, the placement controller 140 may identify the one or more physical machines having the requisite processing capability. Alternatively, the VMM may simply indicate that a fault has occurred and that the placement controller 140 should migrate the virtual machine back to a physical machine on which it previously was located (e.g., the immediately preceding machine or another machine on which the instruction previously was executed successfully).

If, however, the VMM determines that the processing capability is not available, then the VMM may issue an error or other warning message that may be viewed by an administrator of the system 10, such as through the administrative VM 158 (block 214). Typically, however, such an error generally will not occur since the illegal instruction should at least be supported by a CPU on the physical machine on which the virtual machine had been located prior to the virtual machine's migration to the current physical machine which resulted in the instruction fault.

In response to the received information, the placement controller 140 may employ migration control logic 148 in conjunction with the VM layout selector 146 to select another physical machine to host the virtual machine. If only one other physical machine is compatible (e.g., a physical machine on which the virtual machine had previously been located), then the placement controller 140 migrates the virtual machine to that physical machine (block 212). However, in the event that multiple alternative physical machines have the capability to support the virtual machine, then the placement controller 140 may migrate the virtual machine to a selected one of the physical machines based on the predefined migration criteria, such as quality-of-service, loading, balancing, cooling, etc. By configuring the control logic 164 to cause migration by the placement controller 140 in response to detection of the instruction fault, failed execution of a particular application may be avoided.

In some embodiments of the invention, migration of the virtual machine may be performed in response to an instruction fault other than an illegal instruction fault For instance, an instruction fault may occur even if the instruction is supported, but due to other issues with the physical machine, the physical machine cannot execute the instruction. If the instruction fault is a recoverable type of fault (e.g., data has not been corrupted or lost so that the application can safely restart, for instance), then the virtual machine may be migrated in response to the failure of the instruction to execute and restarted on a machine that can execute the instruction.

Having determined that a particular virtual machine requires particular processing capabilities, future migration of that virtual machine to an incompatible physical machine may be prevented. Thus, for instance, as shown in the flow diagram 300 of FIG. 3, when an instruction fault occurs (block 302), the VMM 132 may create a constraint associated with the offending virtual machine that limits placement of the virtual machine to compatible physical machines (block 304). The VMM 132 may communicate this constraint to the placement controller 140 so that the placement controller 140 takes the constraint into consideration in selecting a physical machine whenever the virtual machine is to be migrated (block 306). In some implementations, the constraint may be fashioned as a limitation that dictates that the virtual machine may only be placed on or migrated to particular identified compatible physical machines. For instance, the migration constraint may be stored in the memory 142 of the placement controller 140 for use by the VM layout selector 146 and migration control logic 148 in selecting to which physical machine the virtual machine should be migrated. In other implementations, the constraint may prevent placement or migration of the virtual machine to an incompatible physical machine. For instance, the migration constraint may be stored in the memory 124 of the physical machine 100 to prevent the placement controller 140 from migrating the virtual machine to the physical machine 100. As yet another alternative, the constraint may simply pin the virtual machine to one particular physical machine so that the placement controller 140 can never migrate the virtual machine to any other physical machine.

Figure 3:
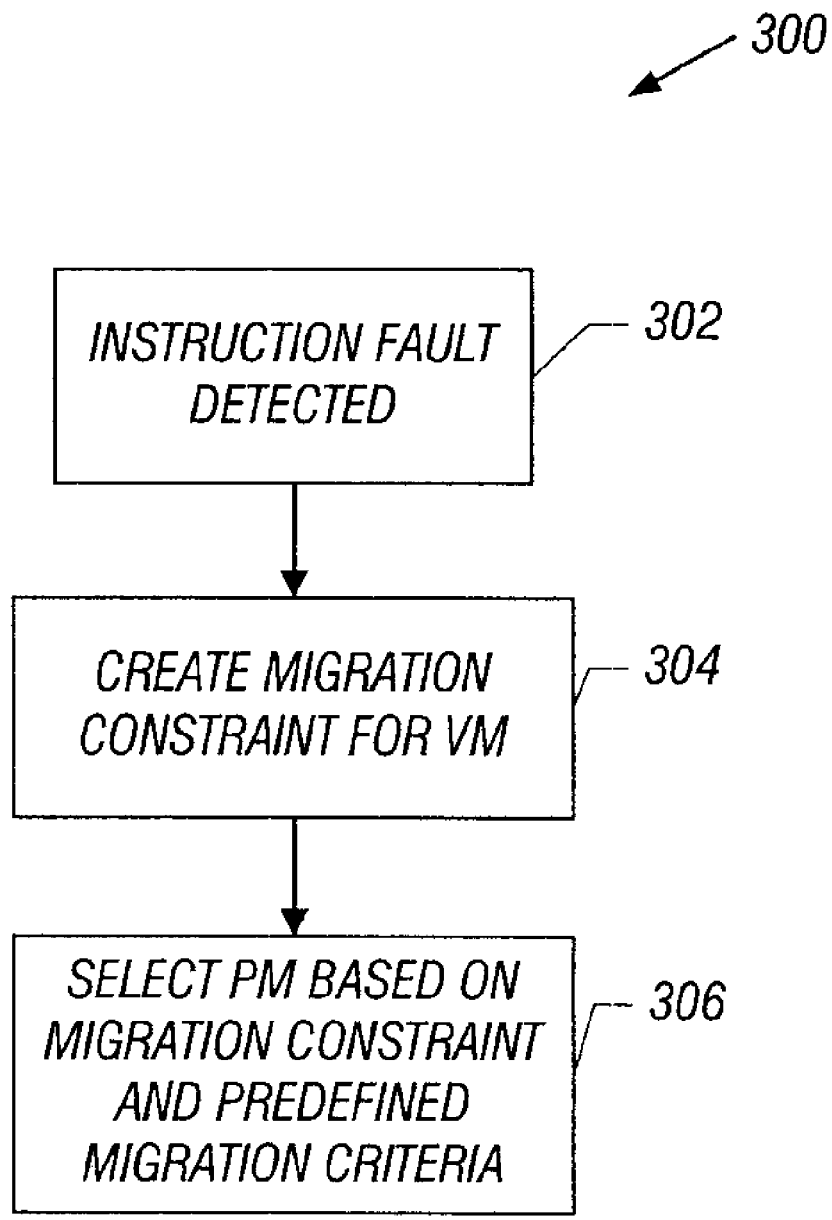
FIG. 3 is a flow diagram depicting a process for creating a migration constraint associated with a virtual machine in response to detection of an instruction fault according to an embodiment of the invention.

The tasks of FIGS. 2 and 3 may be provided by any combination of the VMM control logic 164 and the migration control logic 148 and VM layout selector 146 of the placement controller 140. In addition, the tasks of FIGS. 2 and 3 may be provided in the context of information technology (IT) services offered by one organization to another organization. For example, the infrastructure (including the physical machines and virtual machines of FIG. 1) may be owned by a first organization. The IT services may be offered as part of an IT services contract, for example.

Instructions of software described above (including the VMM 132, device drivers 120, applications 116, the migration control logic 148, the VM layout selector 146, the VMM control logic 164, etc. of FIG. 1) are loaded for execution on one or more processors (such as one or more CPUs 124 and the CPU 142 in FIG. 1). A processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method of migrating a virtual machine, comprising:
   in response to a failure of an instruction to execute on the virtual machine located on a first physical machine, identifying a second physical machine that can execute the instruction, wherein identifying the second physical machine comprises determining that the second physical machine has a processor that is compatible with the instruction; and
   causing migration of the virtual machine by a placement controller from the first physical machine to the second physical machine.

2. The method as recited in claim 1, further comprising:
   creating a migration constraint associated with the virtual machine in response to the failure of the instruction to execute.

3. The method as recited in claim 2, further comprising:
   controlling further migration of the virtual machine by the placement controller based at least in part on the migration constraint.

4. The method as recited in claim 1, further comprising storing in a memory processing capabilities associated with a plurality of physical machines in a network of interconnected physical machines, and wherein determining that the second physical machine has a processor that is compatible with the instruction comprises mapping the instruction to at least one of the stored processing capabilities.

5. The method as recited in claim 4, further comprising selecting the second physical machine based at least in part on a predefined migration criterion.

6. The method as recited in claim 4, wherein the processing capabilities are stored in the memory when the physical machines are added to the network.

7. The method as recited in claim 1, further comprising providing information technology services, wherein the identifying and causing tasks are part of the information technology services.

8. A method of migrating a virtual machine, comprising:
   storing in a memory processing capabilities associated with a plurality of physical machines in a network of interconnected physical machines;
   generating an illegal instruction fault in response to a failure of an instruction to execute on the virtual machine located on a first physical machine of the plurality of physical machines;
   in response to the illegal instruction fault, determining a second physical machine of the plurality of physical machines that can execute the instruction, wherein determining the second physical machine comprises mapping the instruction to at least one of the stored processing capabilities;
   causing migration of the virtual machine by a placement controller from the first physical machine to the second physical machine; and
   creating a migration constraint associated with the virtual machine in response to the illegal instruction fault.

9. The method as recited in claim 8, wherein the migration constraint prevents migration of the virtual machine from the second physical machine.

10. An article comprising at least one computer-readable storage medium containing instructions that when executed cause a processor-based system having a plurality of interconnected physical machines to:
    provide a virtual machine that uses a first processor of a first physical machine to execute an application;
    in response to detection of an instruction associated with the application that cannot be executed by the first processor, determine whether a second physical machine that present in the processor-based system has a processor that is compatible with the detected instruction; and cause migration of the virtual machine from the first physical machine to the second physical machine that has the processor that is compatible with the detected instruction.

11. The article as recited in claim 10, wherein the instructions when executed cause the processor-based system to:

identify a plurality of other physical machines that have a processor that is compatible with the detected instruction; and select one of the identified second physical machines to host the virtual machine based on predefined migration criteria.

12. The article as recited in claim 10, wherein the instructions when executed cause the processor-based system to cause migration of the virtual machine to a physical machine on which the virtual machine previously was placed.

13. The article as recited in claim 10, wherein the instructions when executed cause the processor-based system to create a migration constraint associated with the virtual machine in response to the detection of the instruction.

14. The article as recited in claim 13, wherein the migration constraint limits migration of the virtual machine to one or more physical machines that have a processor that is compatible with the detected instruction.

15. An article comprising at least one computer-readable storage medium containing instructions that when executed cause a processor-based system having a plurality of interconnected physical machines to:

provide a virtual machine that uses a first processor of a first physical machine to execute an application;

in response to detection of an instruction associated with the application that cannot be executed by the first processor, determine whether a second physical machine that can execute the detected instruction is present in the processor-based system; and cause migration of the virtual machine from the first physical machine to the second physical machine, wherein the instructions when executed cause the processor-based system to trap the detected instruction while the application is executing.

16. A first physical machine, comprising:

a virtual machine;

a processor used by the virtual machine to execute an application; and a control logic configured to:

detect an instruction that cannot be executed by the processor; and in response to detection of the instruction, determine presence of a processor in another physical machine that is compatible with the detected instruction, and cause migration of the virtual machine by a placement controller from the first physical machine to the another physical machine.

17. The first physical machine as recited in claim 16, wherein the control logic is further configured to:

create a migration constraint associated with the virtual machine in response to detection of the instruction; and communicate the migration constraint to the placement controller.

18. The first physical machine as recited in claim 17, wherein the migration constraint prevents the placement controller from migrating the virtual machine back to the first physical machine.

19. The first physical machine as recited in claim 17, wherein the migration constraint prevents the placement controller from migrating the virtual machine to any other physical machine that does not have a processor that is not compatible with the instruction.

20. The first physical machine as recited in claim 17, wherein the migration constraint allows the placement controller to migrate the virtual machine to any other physical machine that has a processor that is compatible with the instruction.

* * * * *

UNITED STATES PATENT AND TRADEMARK OFFICE
CERTIFICATE OF CORRECTION

| | | |
|---|---|---|
| PATENT NO. | : 7,925,923 B1 | Page 1 of 1 |
| APPLICATION NO. | : 12/260787 | |
| DATED | : April 12, 2011 | |
| INVENTOR(S) | : Chris D Hyser et al. | |

It is certified that error appears in the above-identified patent and that said Letters Patent is hereby corrected as shown below:

In column 9, line 2, in Claim 10, delete "that present" and insert -- that is present --, therefor.

Signed and Sealed this
Twentieth Day of December, 2011

David J. Kappos
*Director of the United States Patent and Trademark Office*